(12) United States Patent
Ji et al.

(10) Patent No.: US 9,239,272 B2
(45) Date of Patent: Jan. 19, 2016

(54) AUTOMATIC MONITORING AND ALARMING DEVICE BASED ON LARGE STRAIN OF POWER TRANSMISSION TOWER

(75) Inventors: Jinchuan Ji, Shanxi (CN); Wenliang Li, Shanxi (CN)

(73) Assignees: SHANXI ELECTRIC POWER COMPANY, Shanxi (CN); SHANXI ELECTRIC POWER RESEARCH INSTITUTE, Shanxi (CN)

( * ) Notice: Subject to any disclaimer, the term of this patent is extended or adjusted under 35 U.S.C. 154(b) by 431 days.

(21) Appl. No.: 13/882,159

(22) PCT Filed: Aug. 29, 2011

(86) PCT No.: PCT/CN2011/001442
§ 371 (c)(1),
(2), (4) Date: Apr. 26, 2013

(87) PCT Pub. No.: WO2012/065352
PCT Pub. Date: May 24, 2012

(65) Prior Publication Data
US 2013/0226471 A1    Aug. 29, 2013

(30) Foreign Application Priority Data
Nov. 18, 2010  (CN) .......................... 2010 1 0548783

(51) Int. Cl.
| | |
|---|---|
| *G01B 3/44* | (2006.01) |
| *G01M 5/00* | (2006.01) |
| *G01B 7/16* | (2006.01) |
| *G06F 17/18* | (2006.01) |
| *G01B 3/52* | (2006.01) |

(52) U.S. Cl.
CPC .............. *G01M 5/0041* (2013.01); *G01B 7/16* (2013.01); *G06F 17/18* (2013.01)

(58) Field of Classification Search
CPC ..................................................... G01M 5/0041
See application file for complete search history.

(56) References Cited

U.S. PATENT DOCUMENTS

| | | | | |
|---|---|---|---|---|
| 8,319,361 | B2 * | 11/2012 | Lucks ................... | F03D 7/0268 290/44 |
| 2004/0174542 | A1 * | 9/2004 | Handman .............. | G01B 11/16 356/622 |

FOREIGN PATENT DOCUMENTS

| | | |
|---|---|---|
| CN | 101046375 A | 10/2007 |
| CN | 101387505 A | 3/2009 |

(Continued)

OTHER PUBLICATIONS

International Search Report for International Application No. PCT/CN2011/001442 mailed on Nov. 17, 2011 in 8 pages.

*Primary Examiner* — Phuong Huynh
(74) *Attorney, Agent, or Firm* — Knobbe, Martens, Olson & Bear LLP

(57) ABSTRACT

An automatic monitoring and alarming device based on large strain of a power transmission tower comprises a solar cell (7), a wireless alarm sending device (6), an insulation basement (5) and a truss with great probability of generating large strain on the power transmission tower. One end of two invar alloy fine rods is respectively fixed on the insulation basement (5). The first invar alloy fine rod (1A) is fixedly adhered to the truss with great probability of generating large strain on the power transmission tower, and the arrangement direction of which is the same as the strain generating direction of the truss. The second invar alloy fine rod (1B) is sleeved with an insulation bushing (4) and is suspended on the outside of the truss with great probability of generating large strain. The solar cell (7), the wireless alarm sending device (6), a metal probe (2) and a metal contact (3) together form an alarm circuit. The strain of the service power transmission tower is automatically monitored and alarmed by the automatic monitoring and alarming device, which solves the problem that the large strain of the power transmission tower body can not be detected in time in the prior art.

3 Claims, 1 Drawing Sheet

(56) References Cited

FOREIGN PATENT DOCUMENTS

| CN | 101793503 A | 8/2010 |
| CN | 102095361 A | 6/2011 |
| CN | 201926423 U | 8/2011 |
| JP | 57104802 A | 6/1982 |
| KR | 20100057736 A | 6/2010 |

* cited by examiner

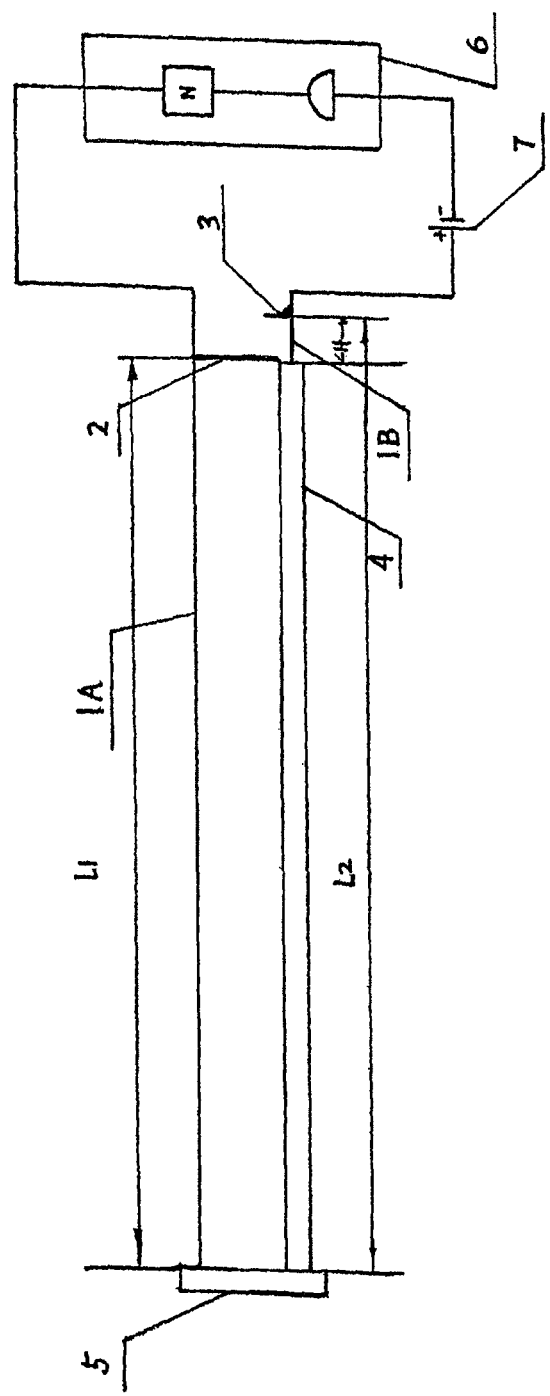

AUTOMATIC MONITORING AND ALARMING DEVICE BASED ON LARGE STRAIN OF POWER TRANSMISSION TOWER

BACKGROUND

1. Field

The present invention relates to a device for automatically monitoring and alarming when a large strain is generated on the body of a service power transmission tower.

2. Description of the Related Art

As the main power transmission equipment, the power transmission tower occupies a large proportion of the total line investment (about 40%). The safe operation of the power transmission tower determines the safe operation of the whole power grid. Due to weather, environment, human factors, etc., the body of the power transmission tower is usually subjected to an elastic or plastic deformation. Particularly, a large strain causes damage and even collapse of the tower body, thereby bringing severe impact and threat to the power supply. In the prior art, the detection and alarming of a strain of the body of the power transmission tower are manually performed regularly or irregularly. As a result, there is a problem that the detection and alarming are not made in time, the large strain often cannot be found and processed in time due to human negligence, and a serious accident may be easily caused. Thus, it is urgent to provide a device capable of automatically monitoring and alarming a large strain of the service power transmission tower, so as to perform an early warning and a processing of the large strain of the tower body in time, and nip hidden dangers in the bud.

SUMMARY

The automatic monitoring and alarming device based on large strain of a power transmission tower provided by the present invention solves the technical problem of the prior art that the detection and alarming of a large strain of the body of the power transmission tower are not made in time, the large strain often cannot be found and processed in time due to human negligence, and a serious accident may be easily caused.

The present invention solves the above problem through the following solutions:

an automatic monitoring and alarming device based on large strain of a power transmission tower, comprising a solar cell, a wireless alarm sending device, an insulation basement and a truss with great probability of generating large strain on the power transmission tower, wherein a first invar alloy fine rod with a length of L1 and a second invar alloy fine rod with a length of L2 have one end fixed on the insulation basement, respectively, and the first invar alloy fine rod and the second invar alloy fine rod are arranged in parallel in the same direction; a metal probe protruding towards the second invar alloy fine rod is fixedly disposed on the other end of the first invar alloy fine rod, a metal contact protruding towards the first invar alloy fine rod is fixedly disposed on the other end of the second invar alloy fine rod, and the insulation basement is fixed on the body of the power transmission tower; the first invar alloy fine rod is fixedly adhered to the truss with great probability of generating large strain on the power transmission tower, and the arrangement direction of the first invar alloy fine rod is the same as the strain generating direction of the truss; the second invar alloy fine rod is sleeved with an insulation bushing and is suspended outside the truss with great probability of generating large strain; an anode of the solar cell is electrically connected with the metal contact on the second invar alloy fine rod, a cathode of the solar cell is electrically connected with one end of the wireless alarm sending device, and the other end of the wireless alarm sending device is electrically connected with the metal probe on the first invar alloy fine rod; and a difference H between the length L1 of the first invar alloy fine rod and the length L2 of the second invar alloy fine rod is a strain capacity of the truss with great probability of generating large strain on the power transmission tower.

The metal contact is arranged in a taper shape in a strain direction of the truss on the second invar alloy fine rod, i.e., the metal contact becomes more and more large along an extension direction of the strain of the truss.

A ratio between the difference H between the length L1 of the first invar alloy fine rod and the length L2 of the second invar alloy fine rod, and the length L1 of the first invar alloy fine rod is 0.2%.

The present invention solves the problem of automatically monitoring and alarming the service power transmission tower, and when the deformation amount of the power transmission tower reaches 0.2% (i.e., the yield point), the device would automatically alarm and feed back information to the monitoring personnel in time.

BRIEF DESCRIPTION OF THE DRAWINGS

FIG. 1 is a structure diagram of the present invention.

DETAILED DESCRIPTION

A device for automatically monitoring and alarming a large strain of a service power transmission tower comprises a solar cell, an alarm sending device and a deformation monitoring zone. The deformation monitoring zone is composed of an insulation basement 5 disposed on a steel frame of the power transmission tower, a first invar alloy fine rod 1A fixedly connected to a truss with great probability of generating large strain on the power transmission tower, and a second invar alloy fine rod 1B suspended outside the truss with great probability of generating large strain. Since the invar alloy fine rods only vary with the strain of the truss, rather than factors such as temperature, when the truss is strained and reaches the yield point, a metal probe 2 on the first invar alloy fine rod 1A protrudes forwards to touch a metal contact 3, so as to conduct a signal sending circuit composed of the solar cell 7 and the wireless alarm sending device 6, and send wireless signals to the cell phone of the monitoring personnel.

The interval between the two invar alloy fine rods is 50 mm, wherein the first invar alloy fine rod has a metal probe at a distance of 500 mm, and the second invar alloy fine rod is sleeved with an insulation bushing in a range of 500 mm and has a metal contact at a distance of 501 mm, i.e., a place where the deformation is 0.2% (the yield point of the large strain of the power transmission tower).

The invar alloy integrates the high electrical and thermal conductivities of silver and the high melting point of tungsten, with the advantages of good electrical conductivity and being slightly temperature influenced.

What is claimed is:

1. An automatic monitoring and alarming device based on large strain of a power transmission tower, comprising a solar cell (7), a wireless alarm sending device (6), an insulation basement (5) and a truss with great probability of generating large strain on the power transmission tower, characterized in that a first invar alloy fine rod (1A) with a length of L1 and a second invar alloy fine rod (1B) with a length of L2 have one end fixedly disposed on the insulation basement (5), respectively, and the first invar alloy fine rod (1A) and the second invar alloy fine rod (1B) are arranged in parallel in the same direction;

a metal probe (2) protruding towards the second invar alloy fine rod (1B) is fixedly disposed on the other end of the first invar alloy fine rod (1A), a metal contact (3) protruding towards the first invar alloy fine rod (1A) is fixedly disposed on the other end of the second invar alloy fine rod (1B), and the insulation basement (5) is fixed on the body of the power transmission tower;

the first invar alloy fine rod (1A) is fixedly adhered to the truss with great probability of generating large strain on the power transmission tower, and the arrangement direction of the first invar alloy fine rod (1A) is the same as the strain generating direction of the truss;

the second invar alloy fine rod (1B) is sleeved with an insulation bushing (4) and is suspended outside the truss with great probability of generating large strain;

an anode of the solar cell (7) is electrically connected with the metal contact (3) on the second invar alloy fine rod (1B), a cathode of the solar cell (7) is electrically connected with one end of the wireless alarm sending device (6), and the other end of the wireless alarm sending device (6) is electrically connected with the metal probe (2) on the first invar alloy fine rod (1A); and a difference H between the length L1 of the first invar alloy fine rod (1A) and the length L2 of the second invar alloy fine rod (1B) is a strain capacity of the truss with great probability of generating large strain on the power transmission tower.

2. The automatic monitoring and alarming device based on large strain of a power transmission tower according to claim 1, characterized in that the metal contact (3) is arranged in a taper shape in a strain direction of the truss on the second invar alloy fine rod (1B), i.e., the metal contact (3) becomes more and more large along an extension direction of the strain of the truss.

3. The automatic monitoring and alarming device based on large strain of a power transmission tower according to claim 1 or 2, characterized in that a ratio between the difference H between the length L1 of the first invar alloy fine rod (1A) and the length L2 of the second invar alloy fine rod (1B), and the length L1 of the first invar alloy fine rod (1A) is 0.2%.

* * * * *